United States Patent [19]

Hroch

[11] Patent Number: 5,463,913
[45] Date of Patent: Nov. 7, 1995

[54] ACTUATOR MECHANISM FOR POSITIONING REFERENCE MEMBERS IN A DOCUMENT TRACK

[75] Inventor: George J. Hroch, Kitchener, Canada

[73] Assignee: NCR Corporation, Dayton, Ohio

[21] Appl. No.: 114,892

[22] Filed: Aug. 31, 1993

[51] Int. Cl.[6] .................................................. G05G 1/04
[52] U.S. Cl. ................................................ 74/526; 74/105
[58] Field of Search .......................... 74/105, 526, 527; 335/131; 29/464; 74/527

[56] References Cited

U.S. PATENT DOCUMENTS

| | | | |
|---|---|---|---|
| 4,132,126 | 1/1979 | Hussey | 74/105 X |
| 4,533,113 | 8/1985 | Francart | 74/105 X |
| 4,706,511 | 11/1987 | Houston | 74/105 |
| 4,887,483 | 12/1989 | Vollath | 74/527 |
| 4,960,187 | 10/1990 | Chi | 74/526 X |
| 5,216,525 | 6/1993 | Lant | 358/496 |
| 5,315,889 | 5/1994 | Moro et al. | 74/105 |

FOREIGN PATENT DOCUMENTS

| | | | |
|---|---|---|---|
| 55-91010 | 7/1980 | Japan | 74/526 |
| 2-11957 | 1/1990 | Japan | 74/105 |
| 5-289763 | 11/1993 | Japan | 74/526 |

*Primary Examiner*—Vinh T. Luong
*Attorney, Agent, or Firm*—Elmer Wargo

[57] ABSTRACT

An actuator mechanism for positioning first and second reference members relative to first and second optical axes for use by first and second imaging devices or cameras which are used to image the front and rear sides of a document. A single solenoid is used to move or rotate the first and second reference members into the appropriate positions. A special actuator member which pivots on the operating plunger of the solenoid is used to provide an extra increment of rotation to enable the accurate location of the first and second references members relative to the first and second optical axes mentioned.

3 Claims, 4 Drawing Sheets

5,463,913

ACTUATOR MECHANISM FOR POSITIONING REFERENCE MEMBERS IN A DOCUMENT TRACK

CROSS REFERENCE TO RELATED APPLICATIONS

This application is related to pending U.S. application, Ser. No. 08/031,300 which was filed by Owen H. Wilson and Geoffrey G. Marlow on Mar. 12, 1993 and which application was assigned to the same assignee as is the present application.

BACKGROUND OF THE INVENTION

1. Field of Invention

This invention relates to an actuator mechanism for positioning reference members, like white and black reference members, in a document track for use with imagers positioned adjacent to the document track.

2. Background Information

In certain business machines, for example, documents passing through the machine are imaged as a part of the processing of documents by the machine. Most of the time, an imager or camera is used to generate the images of the documents. Very often, a black reference member and a white reference are used to set the gain and offset parameters for a particular camera which may be used to image the front of the document, for example. The black and the white reference members may be combined into a single black/white member which has a height equal to the height of documents passing in the document track.

When the business machine has front and rear cameras for imaging the front and rear sides of a document passing in a document track, a second black/white reference member is provided for a second camera which may be used to image the rear of the document in the example being described.

In an effort to reduce the costs associated with having first and second black/white reference members for use with front and rear cameras, respectively, a single actuator was used to position both the first and second black/white reference members into the appropriate positions relative to their associated front and rear cameras.

The appropriate positions mean that when a black reference is required for its associated camera, this reference must be positioned perpendicular to the optical axis of the camera; when a white reference is required, a corresponding position is necessary for the white reference. When the first and second black/white reference members are positioned by a single actuator, the first and second black/white members may not assume the appropriate positions mentioned. When the appropriate positions are not obtained by the first and second black/white reference members, the first and second cameras cannot be calibrated, properly.

SUMMARY OF THE INVENTION

An object of this invention is to provide an apparatus which can position the first and second black/white references members in a properly aligned position relative to associated first and second cameras through using a single actuator.

Another object of this invention is to provide an apparatus of the type mentioned which is of simple and inexpensive construction.

In a first aspect of this invention, there is provided an apparatus comprising:

first and second members mounted for rotation relative to first and second reference axes;

an actuating mechanism for rotating said first and second members from a first position to a second position relative to said first and second reference axes, respectively, and comprising:

a resilient member;

a solenoid;

said actuator member having one end secured to said resilient member to bias said actuator member towards a first position when said solenoid is deenergized;

said solenoid having an output member, with said actuator member pivotally mounted on said output member, and with said solenoid being effective to move said actuator member towards a second position when said solenoid is energized;

first and second pins coupling said first and second members to said actuator member to move said first and second members toward the associated first and second positions; and said actuator member pivoting on said output member to enable said first and second pins to complete the rotation of said first and second members into accurate alignment with said first and second axes at the associated first and second positions.

The above advantages, and others, will be more readily understood in connection with the following specification, claims, and drawing.

DETAILED DESCRIPTION OF THE PREFERRED EMBODIMENT

Figure 1:
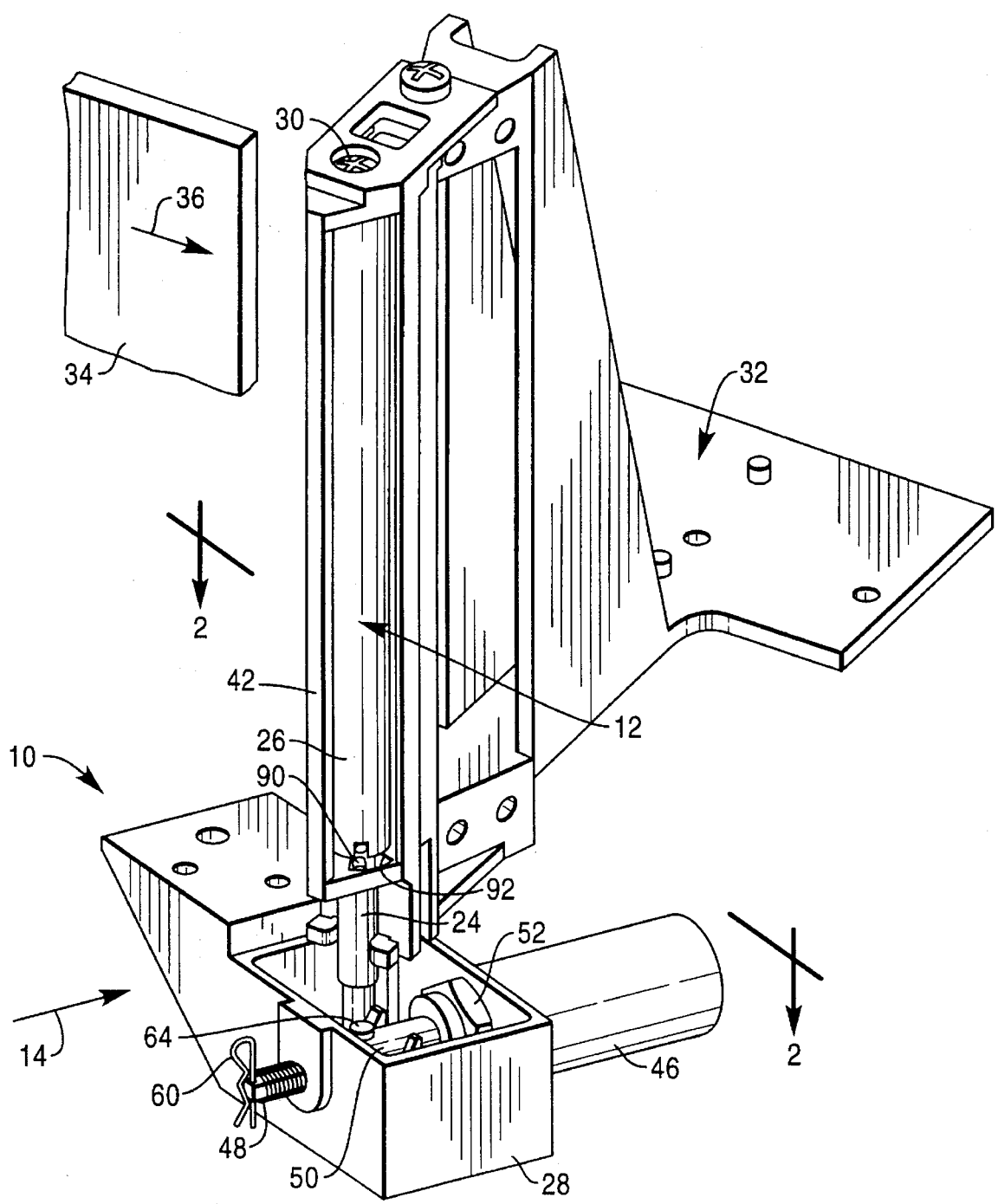
FIG. 1 is a is a general isometric view, showing a preferred embodiment of an actuator mechanism which is used for positioning a reference member relative to a reference axis, for example.

FIG. 1 is a general, isometric view, showing a preferred embodiment of an actuating mechanism, generally designated as 10, which is used for positioning a first reference member 12 relative to a reference axis 14, and for positioning a second reference member 16 (FIG. 2) relative to a second reference axis 18, for example. In the preferred embodiment, the actuating mechanism 10 is used to move or rotate the first and second reference members 12 and 16 relative to their associated first and second reference axes 14, and 18, respectively.

Figure 2:
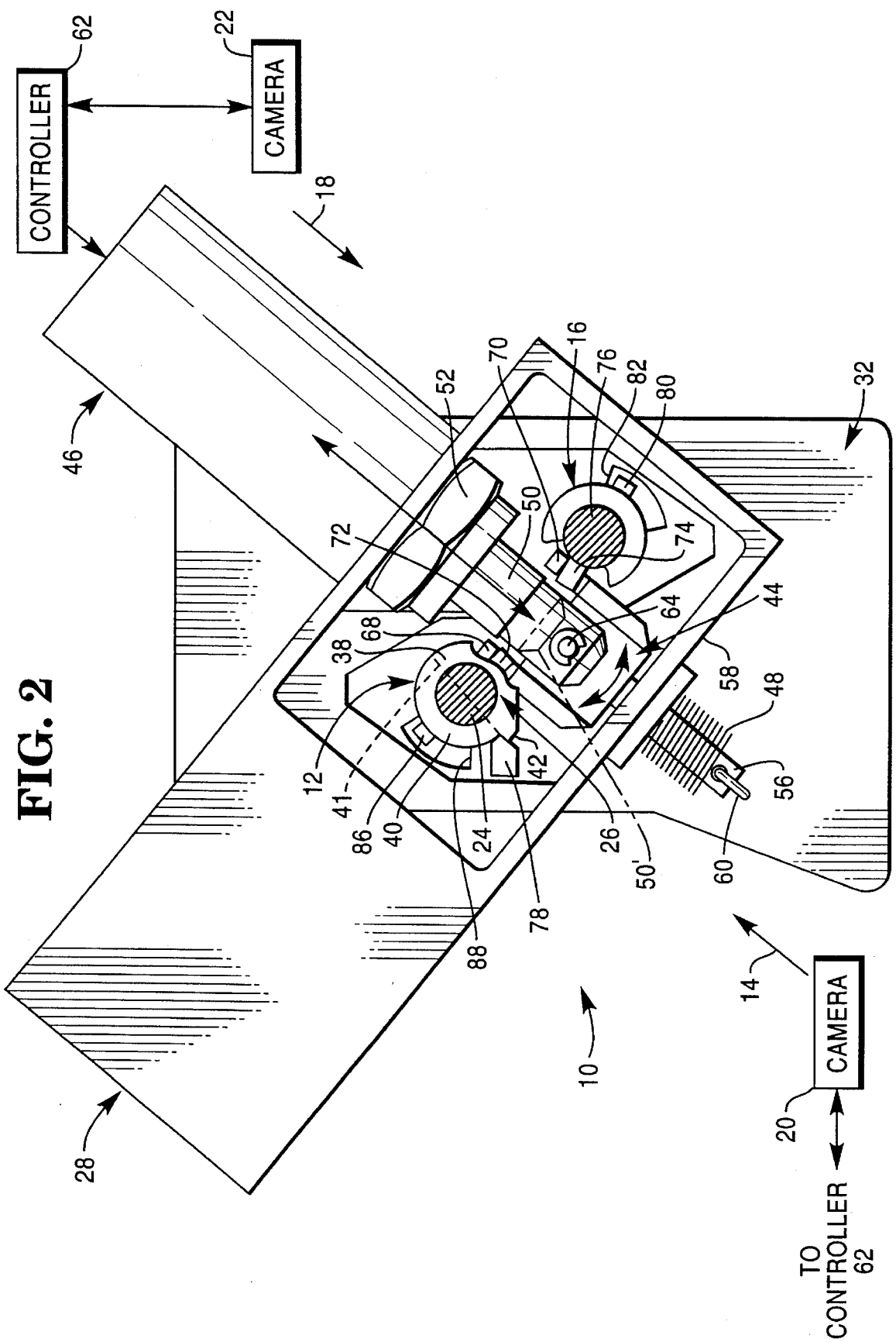
FIG. 2 is a general cross sectional view, taken along the line 2—2 of FIG. 1, to show how the actuator mechanism moves first and second reference members.

In the embodiment described, each of the reference members 12 and 16 may be a black/white reference member which is used to calibrate associated imaging devices or cameras 20 and 22, respectively, as shown schematically in FIG. 2. The first reference member 12 has a shaft 24, with a sleeve 26 fixed thereto, to rotate therewith. The lower end of shaft 24 (as viewed in FIG. 1) is pivotally mounted in a solenoid frame 28, and the upper end 30 of the shaft 24 is pivotally mounted in a reference mount 32 to which the solenoid frame 28 is secured. The reference mount 32 is used to mount the entire actuating mechanism 10 in a document processing machine which includes imagers for imaging the front and rear of a document 34, with the front of the document 34 being imaged by the camera 20 (FIG. 2), and the rear of the document being imaged by the camera 22.

Part of the imaging process associated with cameras 20 and 22 requires that these cameras be calibrated. In the embodiment described, the calibration process requires the use of a white reference member 38 and a black reference member 40 included in the first reference member 12. The white reference member 38 and the black reference member 40 are made of elongated semicircular halves which are joined along the dashed diametral line 41 to provide the sleeve 26 alluded to earlier herein. The white reference member 38 is shown as having a flat surface 42 in FIG. 2 which is positioned perpendicular to the reference axis 14 when the shaft 24 is in the position shown in FIG. 2. Naturally, a white reference member may be switched with a black reference member to suit particular applications. The showing in the various figures of the drawing is a schematic showing which is made to show the important concepts of the invention. The flat surface 42 of the white reference member 38 is used to provide an accurate reflecting surface relative to the optical or reference axis 14 associated with the camera 20.

As stated in the Background of the Invention, it is important that the white and black references associated with their respective cameras be aligned properly during the calibration process mentioned. One of the problems with devices of the type mentioned is that the white and black reference members are not always accurately located due to differences in tolerances with regard to the parts used. The present invention overcomes these problems.

The actuating mechanism 10, alluded to earlier herein, includes an actuator member 44 (best shown in FIGS. 2, 3, and 4), a solenoid 46, and a resilient member or compression spring 48. The solenoid 46 has an output member or shaft 50, and the solenoid is secured to the frame 28 by a fastener 52.

Figure 4:
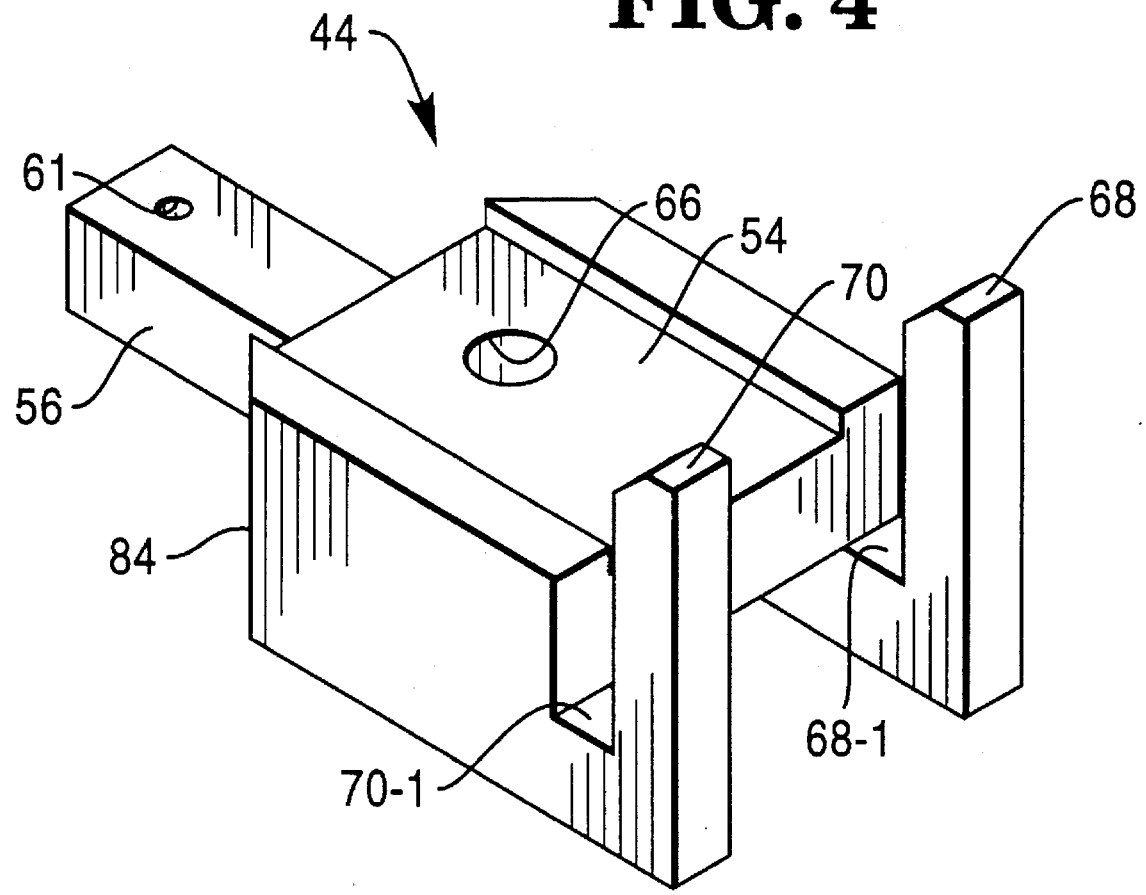
FIG. 4 is an enlarged, isometric view of an actuator member shown in FIGS. 1–3.

The actuator member 44 is shown in more detail in FIG. 4. The actuator member 44 includes a body portion 54 with an end portion 56 (rectangular in cross section) extending through an opening (larger than the cross section of the end portion 56) in the side wall 58 of the frame 28. The compression spring 48 is mounted on the shaft portion 56 between the side wall 58 and a cotter pin 60 passing through a mating hole 61 in the end portion 56. By this construction, the actuator member 44 is biased towards the side wall 58 or a home or first position shown in FIG. 2. The actuator member 44 is pivotally joined to the output shaft 50 of the solenoid 46 by a pin 64 passing through a hole 66 (FIG. 4) in the body portion 54.

The actuator member 44 has first and second legs 68 and 70 (as shown best in FIG. 4) which have notches 68-1 and 70-1 therein to receive pins 72 and 74, respectively, shown best in FIG. 2. Pin 72 is fixed in shaft 24 of the first reference member 12, and correspondingly, pin 74 is fixed in shaft 76 of the second reference member 16.

When the actuator member 44 moves towards the home position, the spring 48 biases the actuator member 44 towards the position shown in FIG. 2 in which the pin 72 rotates the first reference member 12 in a clockwise direction as viewed in FIG. 2. At this time, the pin 74 rotates the second reference member 16 in a counterclockwise direction. The first reference member 12 is further rotated in a clockwise direction until an edge near the flat surface 42 of the reference member 12 abuts against the abutment stop 78 to prevent further rotation of the reference member 12, thereby aligning the white flat surface 42 perpendicular to the reference axis 14. Because the reference member 12 can rotate no further in the clockwise direction, and because the actuator member 44 is pivotally mounted on the pin 64 and biased towards the sidewall 58, the actuator member 44 will pivot on the pin 64 and rotate slightly in the clockwise direction as viewed in FIG. 2. When so rotating, the actuator member will cause the pin 74 in the notch 70-1 of the second leg 70 to rotate the second reference member 16 in a further counterclockwise direction (as viewed in FIG. 2) to bring an upper pin 80 into engagement with an abutment stop 82 located in the solenoid frame 28. The pin 80 is located at a higher level than the pin 74, but both pins 74 and 80 are pinned to the shaft 76 of the reference member 16. When the pin 80 engages the abutment stop 82, the appropriate white or black reference member is properly positioned relative to the second reference axis 18. The white or black reference members like 38 and 40 are not delineated on the second reference member 16. In some situations, it is convenient to have the white reference members of both the first reference member 12 and the second reference member 16 positioned relative to their associated reference axes 14 and 18 when the actuating mechanism 10 is in the home position shown in FIG. 2. In other situations, it may not be. There is some space between the end wall 84 (FIG. 4) of the actuator member 44 and the side wall 58 of the solenoid frame 28 to enable the actuator member 44 to pivot as described.

When the solenoid 46 is energized by a controller 62 (FIG. 2), the operating shaft 50 of the solenoid is withdrawn into the solenoid, moving the actuator member towards a second position (which is shown as 50' in FIG. 2) which is away from the side wall 58. With such movement, the first leg 68 coacts with the pin 72 (FIG. 2) to rotate the first reference member 12 in a counterclockwise direction from the position shown, and correspondingly, the second leg 70 coacts with the second reference member 16 to rotate it in a clockwise direction from the position shown. The second reference member 16 rotates in a clockwise direction until a side of the flat surface (similar to flat surface 42) abuts against a stop (not shown) similar to abutment stop 78 A corresponding action takes place similar to that already discussed in relation to pin 80 and abutment stop 82. Because the actuator member 44 is pivotally mounted on the pin 64, and because the second reference member 16 completes its clockwise rotation when it abuts against a stop similar to abutment stop 78, the first leg 68 rotates slightly in a counterclockwise direction to complete the rotation of the first reference member 12. This rotation is completed or terminated by having a pin 86 secured to the first reference member 12 abut against an abutment stop 88 to properly seat the first reference member 12 against an abutment stop 88 in the frame 28. When so properly positioned, the black reference member 40 is positioned in accurate alignment with the reference axis 14 while the second reference member 16 is positioned in accurate alignment with its associated reference axis 18. Pin 86 is located at a higher level than pin 72 as measured along the height of the associated reference member like 12 shown in FIG. 1. A pin 90 and an abutment stop 92 in the reference mount 32 are shown in FIG. 1 to illustrate the technique mentioned.

Figure 3:
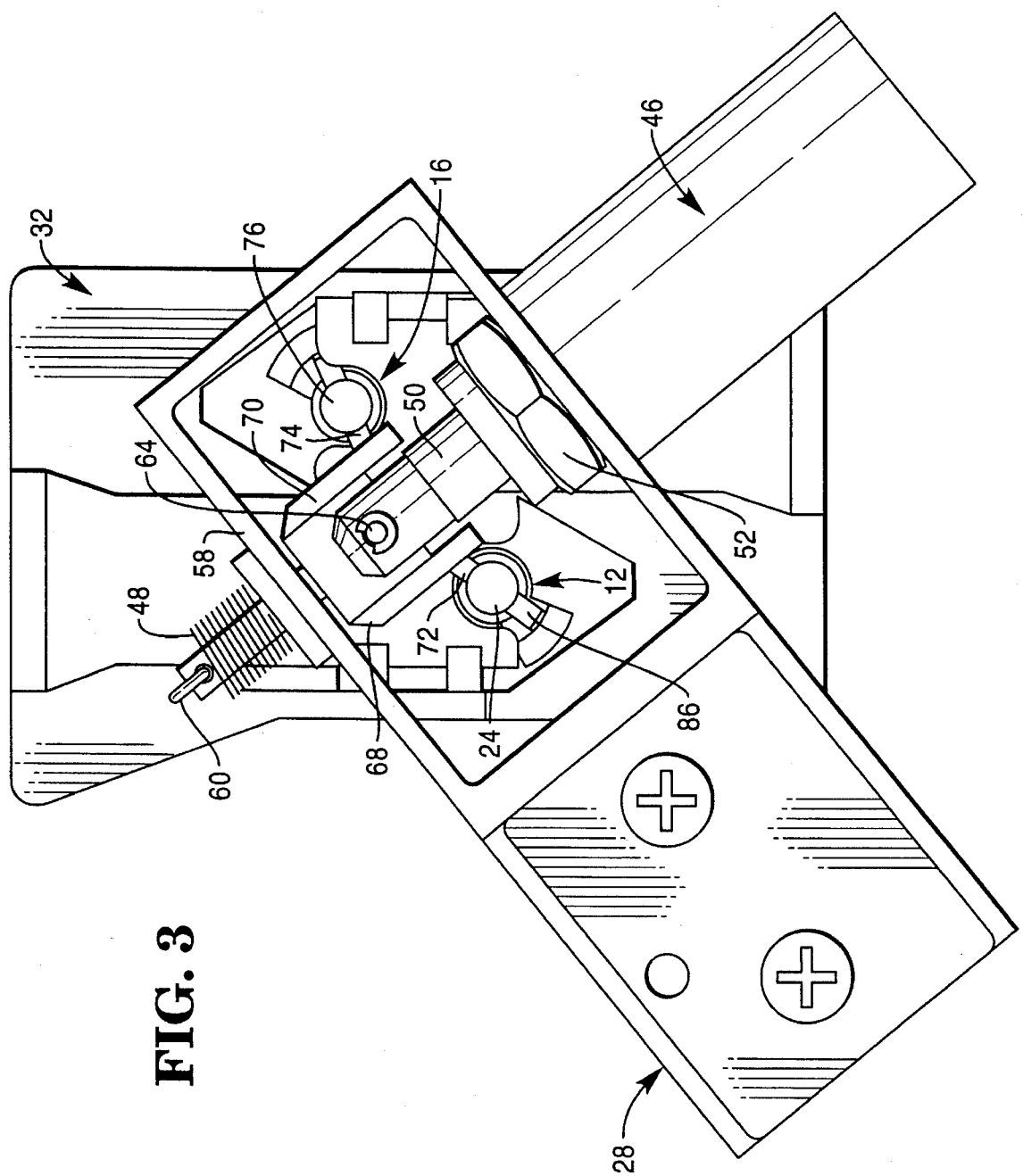
FIG. 3 is a general view, showing the bottom of the actuator mechanism shown in FIGS. 1 and 2.

FIG. 3 is a general view, showing the bottom of the actuating mechanism 10 shown in FIGS. 1 and 2 to show additional details of the actuating mechanism 10. The copending application mentioned earlier herein contains additional details to provide an environment in which this invention may be used. For example, when a white reference member is used to calibrate the associated camera, it is important to have the white reference member extend into the document track where the documents are moved during the process of imaging to provide an accurate reading. In the actuating mechanism 10, the white flat surface 42 of the first reference member 12, for example, extends into the document track to obtain the accurate reading mentioned.

This invention may also be viewed as a method of aligning first and second rotatable members (12 and 16) relative to first and second axes (14 and 18) through using a common actuator (44). The steps for this method may be discussed in claim like language to read as follows:

(a) moving said common actuator (44) in a first direction to rotate said first rotatable member (12) towards alignment with said first axis (14) and to rotate said second rotatable member (16) towards alignment with said second axis (18);

(a) rotating said first rotatable member (12) into accurate alignment with said first axis (14) via said common actuator (44) and an abutment stop (78) causing said common actuator (44) to incur a pivoting movement instead of continuing moving in said first direction; and (c) using said pivoting movement of said common actuator (44) and a second stop (82) to complete the rotation of said second rotatable member (16) into accurate alignment with said second axis (18).

What is claimed is:

1. An apparatus comprising:

first and second members mounted for rotation relative to first and second reference axes;

an actuating mechanism for rotating said first and second members from a first position to a second position relative to said first and second reference axes, respectively, and comprising:

a resilient member;

a solenoid;

an actuator member having one end secured to said resilient member to bias said actuator member towards a first actuator position when said solenoid is deenergized;

said solenoid having an output member, with said actuator member pivotally mounted on said output member, and with said solenoid being effective to move said actuator member towards a second actuator position when said solenoid is energized;

first and second pins coupling said first and second members to said actuator member to move said first and second members toward the associated first and second positions; and said actuator member pivoting on said output member to enable said first and second pins to complete the rotation of said first and second members into accurate alignment with said first and second axes at the associated first and second positions.

2. The apparatus as claimed in claim 1 in which said actuating mechanism also includes:

a first abutment member to limit the rotation of said first member towards said first position;

a third pin secured to said second member; and a second abutment member cooperating with said third pin to limit the rotation of said second member as said actuator member pivots on said output member as said actuator member is biased towards said first actuator position.

3. The apparatus as claimed in claim 1 in which said actuating mechanism also includes:

a first abutment member to limit the rotation of said second member towards said second position when said solenoid is energized;

a third pin secured to said first member; and a second abutment member cooperating with said third pin to limit the rotation of said first member as said actuator member pivots on said output member as said actuator member is biased towards said second actuator position.

* * * * *